United States Patent [19]

Ritsema

[11] Patent Number: 4,530,423
[45] Date of Patent: Jul. 23, 1985

[54] DISC BRAKE INCLUDING TIE BAR ON STATIONARY TORQUE RECEIVING MEMBER

[75] Inventor: Irving R. Ritsema, South Bend, Ind.
[73] Assignee: Allied Corporation, Morristown, N.J.
[21] Appl. No.: 538,398
[22] Filed: Oct. 3, 1983
[51] Int. Cl.³ .............................................. F16D 65/02
[52] U.S. Cl. ................................ 188/73.39; 188/73.45
[58] Field of Search ............... 188/73.39, 73.45, 73.44, 188/73.47, 73.43, 73.34, 73.32, 73.31, 71.1, 72.4, 72.5, 205, 369–370, 361, 18

[56] References Cited

U.S. PATENT DOCUMENTS

| | | |
|---|---|---|
| 3,406,792 | 10/1968 | Kennel ............................. 188/73.45 |
| 4,219,106 | 8/1980 | Lüpertz et al. ............... 188/73.39 X |
| 4,220,224 | 9/1980 | Karasudani ...................... 188/73.39 |

FOREIGN PATENT DOCUMENTS 2440076  3/1976  Fed. Rep. of Germany ... 188/73.39

Primary Examiner—Douglas C. Butler
Attorney, Agent, or Firm—Larry J. Palguta; Ken C. Decker

[57] ABSTRACT

A disc brake includes a torque member for carrying a caliper relative to a rotor. The torque member forms a pair of arms defining a recess receiving a part of the caliper. A tie bar cooperates with the pair of arms to reduce deflection during braking and the tie bar is disposed adjacent that portion of the rotor cooperating with a pair of friction elements.

5 Claims, 3 Drawing Figures

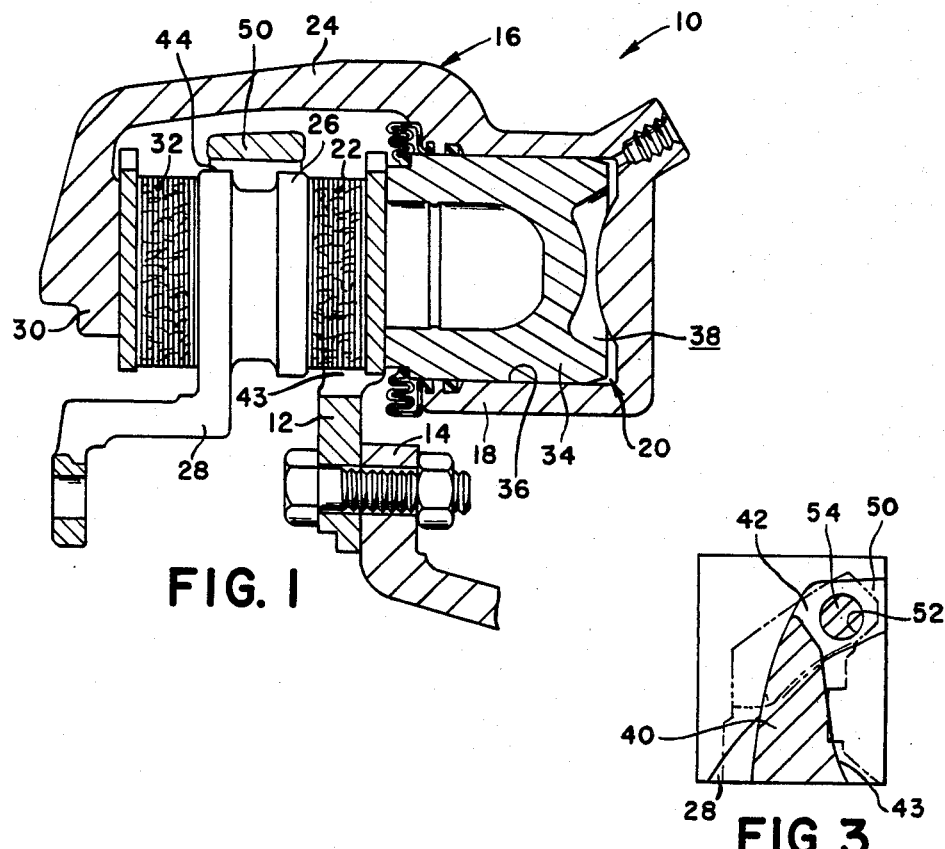
FIG. 1
FIG. 3
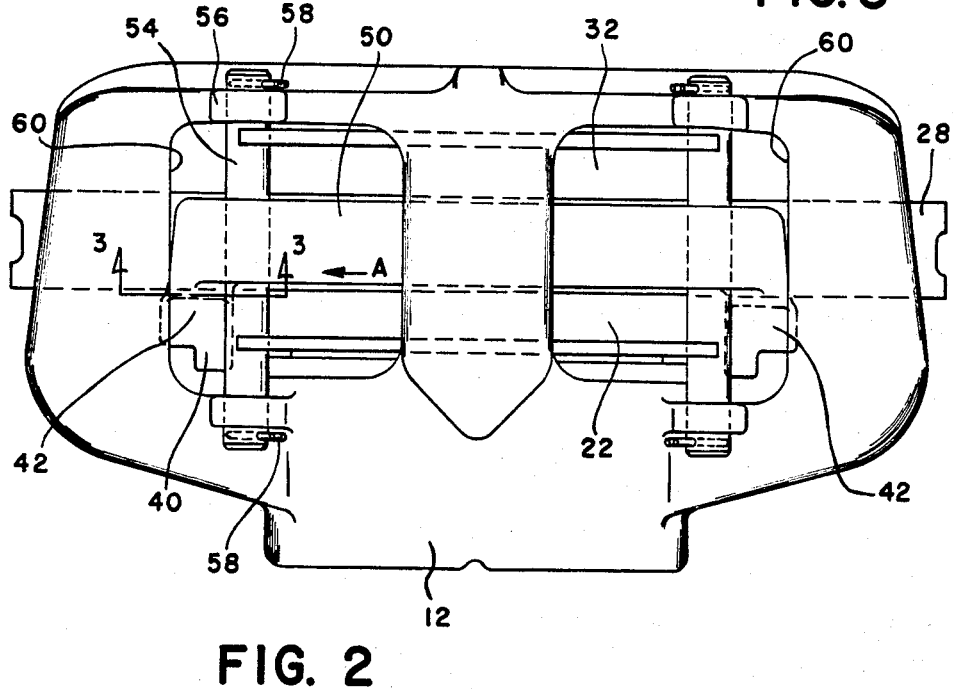
FIG. 2

DISC BRAKE INCLUDING TIE BAR ON STATIONARY TORQUE RECEIVING MEMBER

This invention relates to a disc brake wherein a caliper is movably supported on a torque member such that the caliper biases a pair of friction elements into engagement with a rotor during braking.

In a vehicle equipped with a disc brake, the rotor is disposed adjacent a wheel assembly to rotate therewith. The disc brake includes a caliper which must accommodate spacing limitations between the wheel assembly and the rotor because an outer leg of the caliper must fit between the rotor and the wheel assembly. In addition, the disc brake includes a torque member with a pair of spaced arms opposing rotation of a pair of friction elements. With one of the arms absorbing braking torque from the pair of friction elements, the one arm is loaded to deflect relative to the other arm. The deflection of the one arm imparts stresses to the latter so that it is possible for the one arm to crack and render the disc brake inoperable.

The present invention proposes a disc brake having a caliper movably supported by a torque member and cooperating with a pair of friction elements to urge the latter into engagement with a rotor during braking, the torque member defining a first portion extending radially to a position outside an outer edge of the rotor and a second portion extending axially over the outer edge of the rotor, the first portion forming a recess circumferentially separating a pair of arms from each other in order to receive an actuator portion of the caliper within the recess and the second portion forming a pair of flanges connected, respectively, with the pair of arms and also cooperating, indirectly, with at least one of the pair of friction elements to oppose rotation of the one friction element, characterized in that said torque member further defines a tie bar extending circumferentially between said pair of flanges at a location adjacent a portion of the outer edge of the rotor, whereby said tie bar connects with said pair of flanges to oppose movement between said pair of flanges.

It is an advantage of the present invention that the torque member is reinforced via the tie bar without requiring added spacing between the rotor, the wheel assembly and the caliper The accompanying drawings illustrate one embodiment of the present invention.

FIG. 1 is a side cross-sectional view of a disc brake constructed in accordance with the present invention.

FIG. 2 is a top view of the disc brake shown in FIG. 1.

FIG. 3 is a cross-sectional view taken along line 3—3 of FIG. 2.

A disc brake 10 comprises a torque member 12 fixedly coupled to a wheel or axle support 14. A caliper 16 is movably supported on the torque member 12. The caliper 16 includes an inner leg 18 forming an actuator assembly 20 engaging an inner friction element 22. A bridge portion 24 of the caliper extends over an outer edge 26 of a rotor 28 to connect with an outer leg 30 of the caliper 16. The outer leg 30 engages an outer friction element 32. The actuator assembly 20 includes one or more pistons 34 sealingly disposed within corresponding bores 36 to form one or more pressure chambers 38. Fluid pressure communicated to the pressure chambers 38 biases the pistons 34 toward the rotor 28 to directly engage inner friction element 22 with rotor 28. With the inner friction element engaging the rotor, reaction forces imparted to the caliper 16 cause the latter to move to the right in FIG. 1 so that the outer leg 30 moves the outer friction element 32 into engagement with the rotor 28.

The torque member 12 extends radially outwardly from the support 14 to define a pair of arms, one of which is shown in FIGS. 2 and 3 at 40. The pair of arms 40 are circumferentially spaced to form a recess 43 therebetween for receiving the actuator assembly 20. The pair of arms 40 terminate in a pair of flanges 42, respectively, extending axially across the outer edge 26 of the rotor 28 and adjacent an outer surface 44 of the rotor 28. In order to reinforce the pair of arms and flanges relative to each other a tie bar 50 extends circumferentially between the pair of flanges. The tie bar 50 is disposed within a radial spacing between the outer surface 44 of edge 26 of the rotor 28 and the bridge portion 24 of the caliper 16. From FIG. 1, the axial width of the tie bar 50 is slightly less than the axial width of the rotor 28 so that the tie bar will not hinder removal of the friction elements 22 and 32 after the latter have worn.

Turning to FIG. 3, each flange 42 cooperates with the tie bar 50 at the intersection therebetween to define a bore 52 for movably receiving a pin 54. Each pin 54 is secured to the caliper 12 via caliper lugs 56 and cotter keys 58 so that the caliper moves with the pins relative to the bore 52.

The caliper 16 includes a pair of apertures 60, see FIG. 2, exposing the pins 54, the ends of the tie bar 50, and the ends of the friction elements 22 and 32. The openings provide free flow of air around the rotor and friction elements to reduce heat build up in the rotor and friction elements. In addition, the openings permit the pins 54 to be fitted to the torque member and attached to the caliper after the caliper is disposed in its operative position relative the torque member. When the friction elements are to be replaced, one of the pins 54 is readily accessible for removal from the torque bore. Thereafter, the caliper is pivoted about the other pin to permit friction element removal.

Assuming rotor rotation in the direction A in FIG. 2, a brake application urges the friction elements 22 and 32 against the rotor 28 and in the direction A against the one pin 54 at the left in FIG. 2. The one pin 54 transmits braking forces to its corresponding flange 42 via the wall of bore 52. The braking forces are transmitted from the corresponding left flange 42 in FIG. 2 to its associated arm 40 and support 14 and also to the tie bar 50 to pull on the right flange 42 of FIG. 2. As a result, braking torque is split between the torque member flanges to minimize circumferential deflection for the torque member. In addition, the tie bar 50 minimizes circumferential deflection while at the same time accommodating space limitations with a caliper and wheel assembly associated with the disc brake.

I claim:

1. A disc brake having a caliper movably supported by a torque member and cooperating with a pair of friction elements to urge the latter into engagement with a rotor during braking, the torque member defining a first portion extending radially to a position outside an outermost radial edge of the rotor and a second portion extending axially over the outermost radial edge of the rotor, the first portion forming a recess circumferentially separating a pair of arms of the torque member from each other in order to receive an actuator portion of the caliper within the recess and the second portion forming a pair of flanges connected, respectively, with the pair of arms and also cooperating, indirectly, with at least one of the pair of friction elements to oppose rotation of the one friction element, characterized in that the torque member first portion is on one side of the rotor and the torque member further defines a tie bar extending circumferentially between said pair of flanges at a radial location beyond the outermost radial edge of the rotor, said tie bar connecting said pair of flanges to oppose movement between said pair of flanges and cooperating with said pair of flanges to define a pair of apertures substantially at connections between said tie bar and said pair of flanges, and a pair of pins being disposed within said pair of apertures, respectively, so that each pin extends over the outermost radial edge of the rotor in opposite axial directions to securements on said caliper, the pins movably received in said apertures to provide the movable support of the caliper by said torque member, and at least one of the pins supporting said one friction element so that braking torque is transmitted from the one pin to the respective flange, tie bar, arms and torque member.

2. The disc brake in accordance with claim 1, in which said caliper defines an inner leg on one side of the rotor forming said actuator portion to directly engage one of said pair of friction elements, said caliper defining an outer leg on the other side of the rotor engaging the other friction element, said caliper including a bridge extending axially between the inner and outer legs and over the outermost radial edge of the rotor, and said bridge forming a radial spacing with the outermost radial edge of the rotor such that the tie bar is disposed within said spacing.

3. The disc brake in accordance with claim 1, in which said tie bar defines an axial width substantially equal to but slightly less than the axial width of said rotor.

4. The disc brake in accordance with claim 1, in which said tie bar is disposed within an axial spacing defined by said pair of friction elements.

5. The disc brake in accordance with claim 1, in which said tie bar forms a substantially uniform clearance with said rotor over the entire length of said tie bar.

* * * * *